Figure 1:
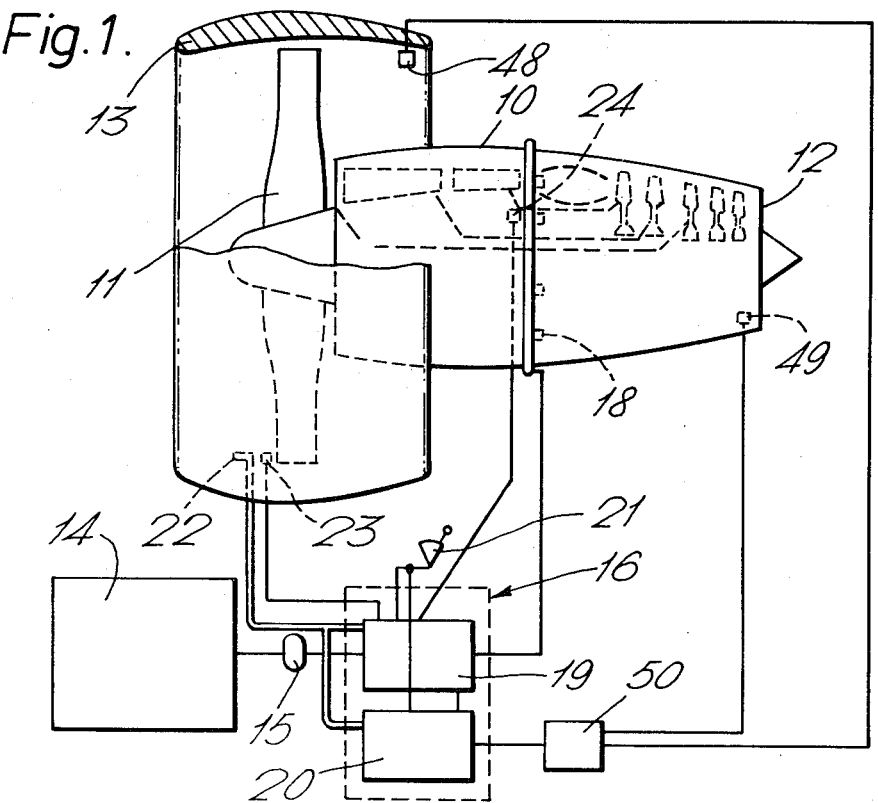

United States Patent [19]

Cantwell

[11] 4,380,898

[45] Apr. 26, 1983

[54] FUEL CONTROL SYSTEM FOR A GAS TURBINE ENGINE

[75] Inventor: Hugh F. Cantwell, Littleover, England

[73] Assignee: Rolls-Royce Limited, London, England

[21] Appl. No.: 208,816

[22] Filed: Nov. 20, 1980

[30] Foreign Application Priority Data

Dec. 21, 1979 [GB] United Kingdom ............... 7944133

[51] Int. Cl.³ ............................................. F02C 9/28
[52] U.S. Cl. ................................... 60/243; 60/39.281
[58] Field of Search .......................... 60/39.28 R, 243

[56] References Cited

U.S. PATENT DOCUMENTS 3,797,233  3/1974  Webb et al. ................. 60/39.28 R
3,854,287 12/1974  Rembold .......................... 60/243
4,033,112  7/1977  Schuster ....................... 60/39.28 R
4,159,625  7/1979  Kerr ............................... 60/243
4,245,462  1/1981  McCombs ...................... 60/39.28 R Primary Examiner—Louis J. Casaregola
Attorney, Agent, or Firm—Cushman, Darby & Cushman

[57] ABSTRACT

A gas turbine engine fuel system of the type using the rotational speed of the high pressure spool as the main control parameter has a trimmer device which reduces the effect of variation of engine geometry in cold starts etc. The trimmer uses the throttle lever angle and engine inlet pressure to compute the desired value of a thrust-related parameter such as weighted mean exhaust pressure, this desired value being compared with the actual value to produce a trim input to the main fuel control unit.

10 Claims, 6 Drawing Figures

FUEL CONTROL SYSTEM FOR A GAS TURBINE ENGINE

This invention relates to a fuel control system for a gas turbine engine.

It is well known in the art that it is necessary to control the flow of fuel to the combustion system of a gas turbine engine in such a way as to provide the correct amount of fuel for any given combination of ambient conditions and thrust demanded by the throttle lever. A variety of such systems have been proposed and it is common to all these systems that they use as a controlling parameter a measured parameter of the engine which varies in accordance with the thrust produced by the engine.

One such parameter which has been commonly used in present day fuel control systems comprises the rotational speed of high pressure rotating systems of the engine ($N_H$). For the steady state condition this parameter has the necessary unique relationship with the thrust produced by the engine and therefore provides a satisfactory control system. However, there are various effects which can disturb this unique relationship between $N_H$ and the thrust of the engine. In particular a cold engine may have a different relationship between $N_H$ and the thrust from that possessed by the same engine after it has warmed up. In order to cater for such differences and still provide the rated maximum thrust at the worst condition it is normal to set the governor high which then means that the engine is running hot under normal conditions.

The present invention provides a fuel control system in which the basic $N_H$ control system is trimmed by a device which gives a more accurate relationship between the chosen thrust and the actual thrust of the engine.

According to the present invention a fuel control system for a gas turbine engine comprises a basic fuel control unit which adjusts the fuel flow to the engine in accordance with the throttle lever angle and the rotational speed of the high pressure spool of the engine so as approximately to produce the desired thrust, and a trimmer which calculates the desired value of a predetermined parameter which has a unique relationship with the thrust required, compares the computed value with the actual value to determine the difference and provides a trimming signal which trims the main control unit in accordance with this difference.

In preferred embodiments the parameter which is more closely related to the thrust comprises the jet pipe pressure for a mixed flow bypass engine, or a weighted mean pressure of fan outlet and core exhaust pressure, or delivery pressure of the high pressure compressor of the engine.

The trimming device may comprise a three-dimensional cam in which the value of a parameter related to ambient conditions and the throttle lever angle are integrated to calculate a desired value for the parameter and a lever system which compares the desired value with the actual value to provide a mechanical trim for the main control unit.

Figure 4:
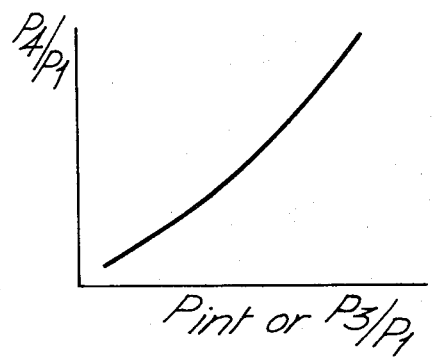
Figure 5:
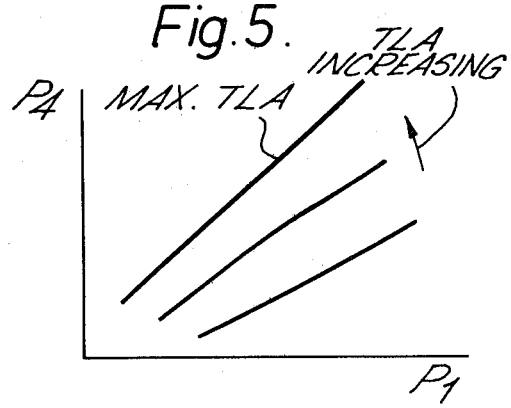
Figure 6:
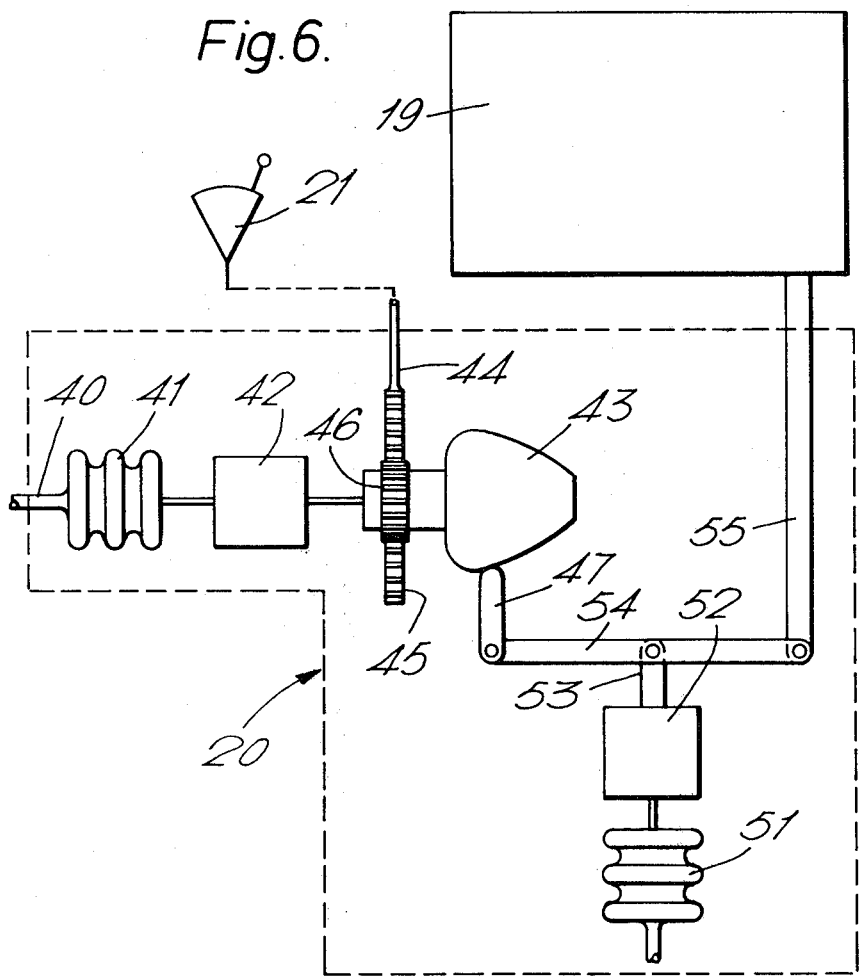

The invention will now be particularly described merely by way of example with reference to the accompanying drawings in which;

FIG. 1 shows a gas turbine engine having a fuel control system in accordance with the invention, FIGS. 2 to 5 are graphs demonstrating the variation of various of the parameters of the engine of FIG. 1 and, FIG. 6 is an enlarged view showing more detail of the fuel control system of FIG. 1.

In FIG. 1 there is shown a gas turbine engine comprising a core engine 10 and a fan 11. The core engine 10 is of conventional design and provides a flow of hot gases through its nozzle 12 to produce propulsive thrust and also has a low pressure turbine which drives the fan 11. The fan 11 gives some compression to the air entering the core engine 10 but it additionally compresses a flow of fan air between a cowl 13 and the core engine 10. This flow passes through the nozzle formed between the downstream extremity of the cowl 13 and the core to provide additional propulsive thrust.

Fuel for the engine flows from a tank 14 through a pump unit 15 and a fuel system 16 to flow to burners 18 in the combustion section of the engine. The pump unit 15 will normally include low pressure and high pressure pumps together with filters and fuel-cooled oil coolers etc as necessary. The fuel system 16 consists of two main items, a main control unit 19 and a trimmer 20.

The main control unit 19 is conventional in its operation and is not described in detail in this specification. As shown the unit 19 has inputs from the pilots throttle lever 21 which provides a thrust demand in terms of the throttle lever angle (TLA). The unit also has inputs from a pitot device 22 which is proportional to the air pressure $P_1$ at the entrance to the fan 11 and from a temperature transducer 23 whose input is proportional to the temperature $T_1$ of the air at entry to the fan. The final input to the unit in this particular embodiment is from a tachometer transducer 24 whose input is proportional to the rotational speed $N_H$ of the high pressure spool of the engine. There may be other inputs to the unit 19 as necessary to control, for instance, acceleration, but these are not relevant to the present invention and are thus not shown.

Based on the calculation performed on these four inputs the control unit 19 varies the fuel flow to the burners 18 to provide the demanded thrust under all conditions of the ambient air. However, the accuracy which can be achieved in this calculation depends upon there being a unique relationship between $N_H$ and the actual thrust of the engine. There are conditions under which this may not be so. These conditions normally arise when the geometry of the engine varies because of differential expansions or other dynamic conditions. Therefore the flow of fuel to the burners 18 is not exactly that required for the demanded thrust.

In order to restore the fuel flow to a closer approximation to the required value the trimmer unit 20 is provided. In order to understand how the trimmer unit 20 operates it is necessary to consider other relationships of parameters in the engine.

Figure 2:
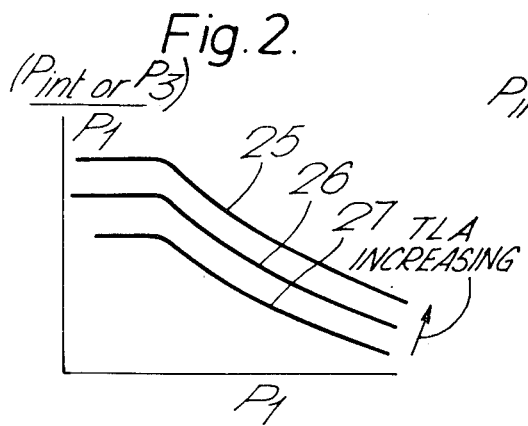
Figure 3:
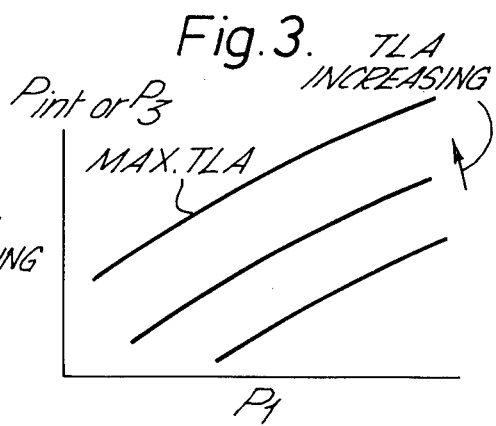

FIG. 2 is a graph of a weighted mean pressure which is a weighted mean between fan outlet pressure and core engine exhaust pressure and which is referred to as $P_{int}$. This weighted mean pressure is equivalent to the jet pipe pressure in an engine where the fan and core systems are mixed before passing through a nozzle to provide thrust. The graph of FIG. 2 shows that the ratio of $P_{int}$ to $P_1$, or alternatively the ratio of $P_3$, the jet-pipe pressure of a mixed flow engine, to $P_1$ varies with $P_1$ in a unique manner to provide a single curve for each position of the throttle lever angle. The family of curves 25, 26 and 27 show how this relationship varies as the throttle lever angle is increased to a maximum value.

By replotting the curves of FIG. 2 a similar family showing the relationship between $P_{int}$ and $P_1$ may be produced. It will therefore be seen that $P_{int}$ or $P_3$, $P_1$ and the pilots throttle lever angle have a unique relationship for a particular thrust.

FIGS. 4 and 5 also show that a similar relationship can be obtained between $P_4$, the high pressure compressor delivery pressure, and $P_1$.

It will therefore be understood that using a measured and calculated value of $P_{int}$, $P_3$ or $P_4$ a more exact value of thrust may be obtained.

FIG. 6 shows how the trimmer unit 20 operates to provide this more exact value of the fuel flow. It will be seen that the trimmer unit 20 has an input 40 of the pressure $P_1$ taken from the tapping 22. This pressure enters the bellows 41 whose free end operates a position servo 42. The servo then causes axial movement of a three dimensional cam 43.

A second input to the trimmer is on the rod 44 which is connected to the pilots throttle lever 21 so that the input is proportional to the pilots throttle lever angle. The rod 44 operates a rack 45 which rotates a pinion 46 and thus rotates the three dimensional cam 43. The cam is so shaped that the movement it provides to a pick off rod 47 is proportional to the value of $P_{int}$ required for a particular combination of demanded thrust via pilots throttle lever angle and the intake pressure $P_1$.

The actual value of $P_{int}$ is provided by sensors 48 and 49 which measure fan outlet pressure and core outlet pressure respectively. These two pressures are averaged in a unit 50 to provide a weighted mean. This weighted mean pressure or $P_{int}$ is then supplied to a bellows 51. As in the case of the bellows 41 its free end operates a positional servo 52 which then moves a pivot point 53 of a lever 54.

One end of the lever 54 is connected to the pick off rod 47 while the other end is connected to an output rod 55. It will be seen that the actual value of $P_{int}$ is fed into the rod 55 at the pivot 53 while the calculated value is fed in at its left-hand end. Movement of its right-hand end and of the rod 52 therefore depends upon the difference between the calculated and actual values of $P_{int}$. The rod 52 feeds this difference as a trim signal into the control unit 19 to provide a fine control for the fuel flow to the engine.

It should be noted that at low engine powers the $P_{int}$ control may become less precise. Therefore it is convenient to arrange that the shape of the cam 43 is such that the trim becomes zero below a certain value of pilots throttle lever angle, so that at lower powers the control unit 19 operates without trim.

It will be appreciated from the description above that the pressure $P_{int}$ referred to could be replaced by the jet pipe pressure in a mixed flow engine or indeed by the high pressure compressor delivery pressure. Both of these pressures could be measured by a simple pressure tapping well known to those skilled in the art, and all three of these pressures have a unique relationship with engine thrust whether the engine is hot or cold.

It will also be understood that the embodiment described has a control unit which uses $P_1$ and $T_1$ as additional inputs. It will be appreciated by those skilled in the art that it is possible to have a control unit operating on an input of $N_H$ and throttle lever angle alone or an arrangement where $T_1$ is replaced by fan outlet temperature. The present invention is equally applicable to these simpler control systems.

Although the three dimensional cam described is a reliable and well tried apparatus for combining the two parameters in the necessary manner it is quite possible to replace this device by some form of electronic computer. In this case it will of course be necessary to convert the pneumatic and mechanical inputs proportional to the various parameters by electronic signals and an electronic output will be provided which will operate on a servo to vary the fuel flow.

I claim:

1. A fuel system for a gas turbine engine of the type having a high pressure spool, means for producing signals proportional to the rotational speed of the high pressure spool, engine inlet pressure and at least one other parameter uniquely related to the thrust produced by the engine, a thottle lever for selecting a desired value of engine thrust and a main fuel control unit for adjusting the fuel flow to the engine in accordance with the throttle lever angle and the measured rotational speed of the high pressure spool so as approximately to produce the desired thrust, and a trimmer for determining from the throttle lever angle and said engine inlet pressure the desired value of said other parameter, comparing the computed value with the measured value, and applying a trimming input to the main fuel control unit to trim this unit in accordance with the input to provide a fuel flow to the engine which causes the engine to produce the desired engine thrust.

2. A fuel system as claimed in claim 1 and in which said other parameter comprises the jet pipe pressure.

3. A fuel system as claimed in claim 1 and in which said other parameter comprises a weighted mean of the fan outlet pressure and the core exhaust pressure.

4. A fuel system as claimed in claim 1 and in which said other parameter comprises the delivery pressure of the high pressure compressor of the engine.

5. A fuel system as claimed in claim 1 and in which said trimmer comprises a three-dimensional cam by which the signals from said means for producing signals responsive to engine inlet pressure and the value of the throttle lever setting are integrated to calculate a desired value of said other parameter.

6. A fuel system as claimed in claim 5 and in which the inputs to said three-dimensional cam separately effect axial translation and rotation of the cam.

7. A fuel system as claimed in claim 5 comprising a lever system for comprising the desired value of the other parameter with the actual value and for providing a mechanical trim for the main fuel control unit.

8. A fuel system as claimed in claim 7 and in which said lever system comprises a lever having two extremities and an intermediate pivot point, and linkages which transmit the output from said three-dimensional cam to one said extremity, a motion responsive to said other parameter to said pivot, and the motion of said other extremity to said main fuel control unit as a mechanical trim.

9. A fuel system as claimed in claim 1 and comprising means for providing zero trim to the main control unit below a predetermined desired value of engine thrust.

10. A fuel system as claimed in claim 9 and in which said means comprises a three-dimensional cam by which the setting of said throttle lever angle and said signal responsive to engine inlet pressure are combined to produce a calculated value of said other parameter, said cam being shaped to provide zero trim below a predetermined desired value of engine thrust.

* * * * *